Feb. 2, 1965 W. J. CHORKEY 3,168,168
ADJUSTABLE HYDRAULIC SHOCK ABSORBER
Filed Sept. 18, 1963
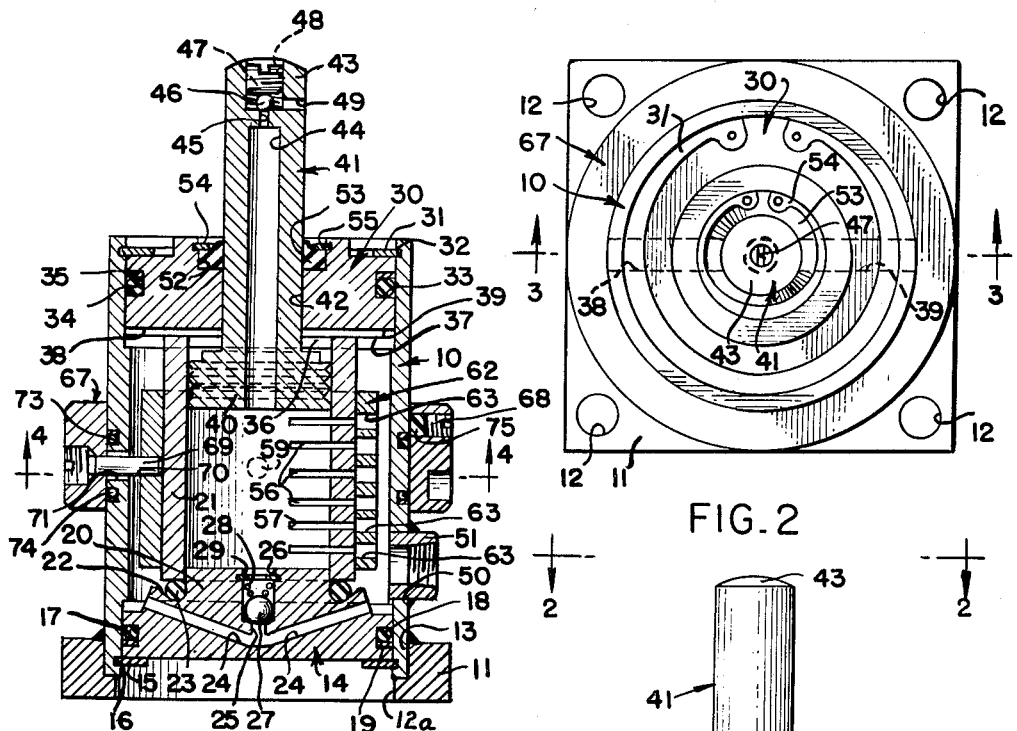
FIG. 3
FIG. 2
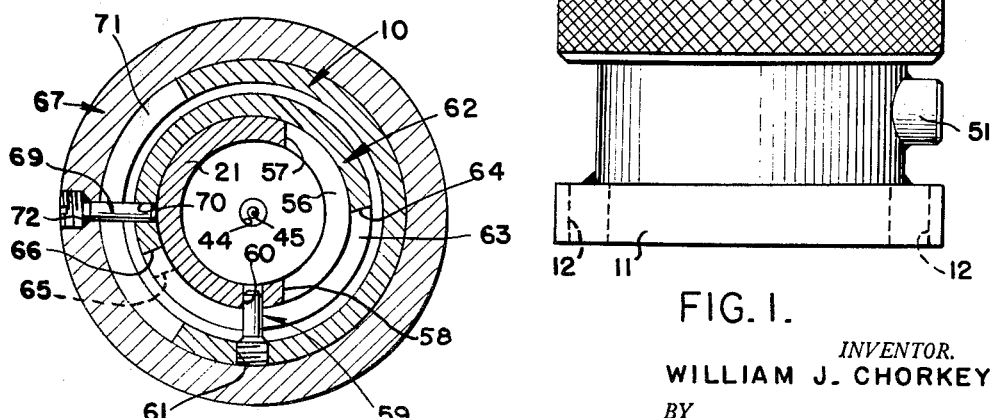
FIG. 4
FIG. 1.
*INVENTOR.*
WILLIAM J. CHORKEY
BY
Donnelly, Mentag & Harrington
ATTORNEYS

United States Patent Office 3,168,168
Patented Feb. 2, 1965

3,168,168
ADJUSTABLE HYDRAULIC SHOCK ABSORBER
William J. Chorkey, 32331 Baintree, Farmington, Mich.
Filed Sept. 18, 1963, Ser. No. 309,639
8 Claims. (Cl. 188—96)

This invention relates generally to shock absorbers, and more particularly to an adjustable hydraulic shock absorber which is capable of being adjusted to absorb shock loads of varying amounts, from low shock loads to high shock loads.

Heretofore, shock absorbers were customized or built in accordance with the requirements of the particular job they were to perform. This is a disadvantage since the building of a separate shock absorber for each type job is costly and requires many different types of shock absorbers, as for example, in plants where various shock loads are encountered, many different sizes of shock absorbers will have to be stocked. Accordingly, it is the primary object of the present invention to provide a novel and improved adjustable shock absorber which may be adjusted to dissipate either light or heavy shock loads.

It is another object of the present invention to provide a novel and improved adjustable hydraulic shock absorber which is simple and compact in construction, economical of manufacture and efficient in operation.

It is another object of the present invention to provide a novel and improved adjustable hydraulic shock absorber which includes an outer tube adapted to be connected to a source of hydraulic oil under pressure, an inner tube disposed in said outer tube and spaced apart therefrom and in which is slidably mounted a piston and rod assembly for receiving a shock load, said inner tube being adapted to receive hydraulic oil under pressure from said outer tube and being provided with a plurality of hydraulic oil escape slots, and wherein the amount of opening of said slots is varied by means of an adjustable member rotatably mounted on the inner tube to control the deceleration of the piston and rod assembly when it is moved inwardly in said inner tube to dissipate a shock load by forcing the oil from the inner tube into the outer tube through said escape slots.

Other objects, features and advantages of this invention will be apparent from the following detailed description, appended claims, and the accompanying drawing.

In the drawing:

FIG. 1 is a side elevational view of an adjustable hydraulic shock absorber made in accordance with the principles of the invention;

FIG. 2 is a top plan view of the structure illustrated in FIG. 1, taken along the line 2—2 thereof, and looking in the direction of the arrows;

FIG. 3 is an elevational sectional view of the structure illustrated in FIG. 2, taken along the line 3—3 thereof, and looking in the direction of the arrows; and, FIG. 4 is a horizontal sectional view of the structure illustrated in FIG. 3, taken along the line 4—4 thereof, and looking in the direction of the arrows.

Referring now to the drawing, wherein is shown an illustrative embodiment of the invention, the numeral 10 generally designates the outer tube or body of the shock absorber. The body 10 of the shock absorber is carried on the mounting pad 11 which is provided with a plurality of holes 12 for mounting the shock absorber in an operative position. The mounting pad 11 is provided with an opening 12a which extends therethrough and is enlarged at the inner end thereof as indicated by the numeral 13. The rear end of the outer tube 10 is mounted in the enlarged opening 13 and is fixedly secured therein by any suitable means, as by welding.

As shown in FIG. 3, the blind end or cap end of the outer tube 10 is enclosed by the rear cylinder head 14 which is retained in the rear end of the outer tube 10 by any suitable means, as by the retainer ring 15. The retainer ring 15 may be of any conventional type and is adapted to be releasably mounted in the annular groove 16 formed in the rear interior surface of the outer tube 10. The rear cylinder head 14 is provided with a circumferential groove 17 in which is operatively mounted a conventional O-ring sealing means 18 and a back-up ring 19.

As shown in FIG. 3, the rear cylinder head 14 is provided on the inner side thereof with the annular inwardly extended reduced portion 20 over which is mounted the rear end of the inner tube or cylinder 21. The rear cylinder head 14 is provided with the circular recess 22 which is formed around the projection 20. Mounted in the recess 22 is an O-ring sealing means 23 for sealing engagement with the rear end of the inner tube 21.

The rear end of the inner tube 21 is connected to the rear end of the outer tube by the following described passageway. As shown in FIG. 3, a pair of passages 24 are formed through the rear cylinder head 14 with their outer ends communicating with the interior of the outer tube 10 and their inner ends connected to the axially extended passage 25.

The passage 25 communicates at its inner end with the enlarged passage 26 which in turn opens into the interior of the inner tube 21. A check valve in the form of a ball 27 is mounted in the enlarged passage 26 and is normally biased by means of the spring 28 against the inner end of the passage 25 to close the same. A suitable retainer ring 29 is mounted in the inner end of the passage 26 to retain the spring 28 in place in the passage 26.

As shown in FIGS. 2 and 3, the front end or rod cylinder end of the outer tube is enclosed by the gland or rod cylinder head generally indicated by the numeral 30. The rod cylinder head 30 is mounted in the front end of the outer tube 10 and retained in place by means of a suitable retainer ring 31 which is mounted in the groove 32 formed in the inner periphery of the outer tube 10. The rod cylinder head 30 is provided with a circumferential groove 33 in which is operatively mounted an O-ring sealing means 34 and a back-up ring 35.

As shown in FIG. 3 the inner end of the rod cylinder head 30 is provided with an annular, axially inwardly extended hub 36 which is adapted to be received in the front end of the inner tube 21. The front end of the inner tube 21 is adapted to abut the annular face 37 on the inner end of the rod cylinder head 30. As shown in FIGS. 2 and 3, a pair of radially disposed cross slots 38 and 39 are formed on the inner side of the rod cylinder head 30 to communicate the front end of the outer tube 10 with the front end of the inner tube 21. It will be seen that the inner tube 21 is operatively mounted between the cylinder heads 14 and 30, and that the O-ring sealing means 23 functions to prevent leakage from the inner tube 21 and corrects any tolerance error in these parts.

As shown in FIG. 3, the shock absorber of the present invention includes a piston 40 which is slidably mounted in the inner tube 21 and which is provided on the periphery thereof with a plurality of circumferential V-grooves for trapping oil therein to provide an oil film for lubrication purposes when the piston 40 is moved within the tube 21. A piston rod 41 is integrally connected at its inner end to the piston 40, and this rod extends outwardly through the axial bore 42 formed through the rod cylinder head 30 which guides the rod and functions as a brass bearing. The piston rod 41 is provided with a rounded outer end surface, as indicated by the numeral 43, for engagement with objects which are to be controlled by the shock absorber.

As shown in FIG. 3, the piston rod 41 is provided with an axial hole 44 which extends longitudinally through the piston 40 and communicates at its inner end with the interior of the inner tube 21. The outer end of the hole 44 terminates at a point adjacent the outer end of the piston rod, and at this point it communicates with a reduced axial hole 45. The outer end of the hole 45 is normally closed by the ball check valve 46. The ball check valve 46 is adapted to be moved into closing engagement with the outer end of the hole 45 by means of the set screw 47 which is threadably mounted in the threaded hole 48 formed in the outer end of the piston rod 41. The inner end of the threaded hole 48 is connected to the atmosphere by means of the transverse hole 49.

The passage formed by the holes 44, 45 and 49, and ball check structure 46 is provided for bleeding the interior of the shock absorber. It is first filled with hydraulic oil under pressure. As shown in FIG. 3, the outer tube 10 is provided with a hole 50 on one side thereof in which is fixedly mounted an inlet port 51 for admitting pressurized hydraulic oil into the shock absorber. The inlet port 51 would be connected to a conventional air-oil tank which is half filled with oil in the lower end thereof and which is provided with air under pressure in the top end thereof.

As shown in FIGS. 2 and 3, the rod cylinder head axial hole 42 is enlarged by the inwardly extended axial recess 52 on the outer side thereof. Mounted in the recess 52 is the rod wiper material 53. A suitable retaining ring 54 is mounted in the annular groove 55 formed in the wall of the recess 52 for retaining the wiper material 53 in place around the circumference of the piston rod 41. The interior of the inner tube 21 is connected to the interior of the outer tube 10 by means of a plurality of longitudinally spaced apart, parallel, circumferentially extended escape passages or slots 56. The escape slots 56 extend circumferentially from the point 57 at one end thereof to the point 58 at the other end thereof, as shown in FIG. 4. The inner and outer tubes 21 and 10 are adapted to be fixed together against relative movement by means of the pin 59, shown in FIGS. 2 and 3, which has its inner end slidably mounted in the radial recess 60 in the inner tube 21, and the outer end thereof threadably mounted in the hole 61 in the outer tube 10.

As shown in FIGS. 3 and 4, an adjusting tube or intermediate tube 62 is rotatably mounted in telescopic fashion around the inner tube 21. The adjusting tube 62 functions to control the flow of escaping fluid through the slots 56 in the inner tube 21 during inward movement of the shock absorber piston 40. The adjusting tube 62 is provided with a plurality of longitudinally spaced apart, parallel, circumferentially extended passages or slots indicated by the numeral 63. As illustrated in FIG. 3, there are six of the slots 63 and they are disposed in alignment with the six slots 56 formed in the inner tube 21. The slots 63, with the exception of one of them, extend circumferentially from the point 64 at one end thereof to the point 65 at the other end thereof, as shown in FIG. 4. Said one of the slots 63 is enlarged for the passage therethrough of the pin 59. This one enlarged slot 63 is also extended for a greater distance circumferentially around the adjusting tube 62 from the point 64 to the point indicated by the numeral 66 in FIG. 4.

The adjusting tube 62 is adapted to be rotatably adjusted about the inner tube 21 by the following described structure. As shown in FIGS. 1, 2, 3 and 4, the numeral 67 generally indicates an adjusting ring which is rotatably mounted on the exterior surface of the outer tube 10. As particularly shown in FIG. 3, the adjusting ring 67 is provided with a headless set or lock screw 68 which is adapted to be threaded inwardly against a hard plastic rod identified by the numeral 75 for pressing said rod against the outer periphery of the outer tube 10 for releasably locking the adjusting ring 67 in an adjusted position relative to the outer tube 10. The plastic rod 75 bears on the outer tube 10 and eliminates metal-to-metal contact and scoring between the screw 68 and the outer tube 10. As shown in FIGS. 3 and 4, the adjusting ring 67 is locked or fixed to the adjusting tube 62 by means of the pin 69 which also functions to retain the adjusting tube 21 in its relative longitudinally adjusted position on the inner tube 21 while permitting relative rotation between these two tubes. The pin 69 extends through the adjusting ring 67 and has its inner end slidably mounted in the recess 70 formed in the outer surface of the adjusting tube 62. The pin 69 is adapted to pass through the circumferential slot 71 formed in the outer tube 10. The slot 71 limits the rotary movement of adjusting ring 67 and adjusting tube 62. The length of slot 71 is equal to twice the length of the slots 63 plus the diameter of pin 69. The pin 69 is threaded in place in the adjusting ring 67 and is provided with the O-ring sealing means 72 on the inside of the head of the pin. As shown in FIG. 3, a pair of circumferential O-ring sealing means 73 and 74 are disposed in suitable recesses around the outer surface of the outer tube 10, on opposite sides of the passage or slot 71, and pins 59 and 69, to prevent leakage of fluid under pressure from the interior of the outer tube 10. The O-ring sealing means 73 and 74 are provided with suitable back-up rings.

In use, the shock absorber of the present invention would be mounted in place by means of the mounting pad 11 so that the cylinder rod 41 would be moved inwardly by the apparatus which is to be engaged by the cylinder rod 41 for decelerating the apparatus or absorbing shock blows in the apparatus. The shock absorber would first be filled with oil under pressure from the aforementioned air-oil tank or other suitable source of pressurized hydraulic oil. The oil under pressure enters the outer tube 10 through the inlet port 51 and then passes through the slots 63 and slots 57 and into the interior of the inner tube 21. The set screw 47 is backed off to permit air trapped inside of the shock absorber to bleed out through the transverse hole 49 to the atmosphere. When oil appears in the hole 49, the set screw 47 is tightened to force the ball check valve 46 against the outer end of the hole 45 and seal off the same. The shock absorber unit is then primed and ready for use.

With the piston rod disposed in the position shown in FIG. 1, the shock absorber is in a position to receive a shock blow and dissipate the same. The rod 41 receives the shock blow and starts to dissipate the shock blow as it is moved inwardly. As the piston and rod assembly moves inwardly, the piston closes off one of the slots 56, and then another slot 56, and then another slot 56, and so forth. The inward speed of the piston and rod assembly decelerates as the piston 40 closes off the escape path through the escape slots 56 for the oil which is trapped in the inner tube 21. As each of the succeeding escape slots 56 is closed off by the inwardly moving piston 40, the piston and rod assembly slows down. As the piston and rod assembly nears the inner end of the inner tube 21, the load on this assembly must be dissipated before it hits the inner surface of the rear cylinder head 14. If the load is not dissipated by the time the piston 40 engages the rear cylinder head 14, the snap ring 15 will hold the rear cylinder head 14 in place and will take a physical blow. When the movement of the piston and rod assembly has been stopped, the assembly will be moved outwardly to its original position, as shown in FIG. 1, for the next shock absorbing operation by means of the oil in the shock absorber which is under pressure from the source of pressurized hydraulic oil. The oil is forced into the inner tube 21 during the return stroke through the passages 24 and 25 and past the ball check valve 27 which will be forced into the open position by the entering oil under pressure.

The radial or cross slots 38 and 39 permit the oil under pressure in the space between the inner tube 21 and the outer tube 10 to enter and fill the space behind the piston 40 to prevent the forming of a vacuum. Since the area on the inner face of the piston 40 is greater than the area on the outer or cylinder end face, the pressure differential is always greatest on the inner face of the piston for returning the same to the original position, as shown in FIG. 3.

The escape velocity of the fluid through the slots 56 into the outer tube 10 determines the deceleration rate of the piston 40 when it is moved inwardly. In order to adjust the amount of opening of the slots 56, the adjusting tube 62 is rotated in accordance with the desired amount of opening of the slots 56. For example, when the adjusting tube 62 is in the position as shown in FIG. 4, it will be seen that only a portion of the slot 56 is open through the adjacent slot 63. When the adjusting tube 62 is rotated counterclockwise, as viewed in FIG. 4, the entire slot 56 would be opened. When the adjusting tube 62 is rotated as viewed in FIG. 4 in a clockwise direction, the entire length of the slot 56 may be enclosed by the adjusting tube 62 whereby no fluid would pass from the inner tube and the shock absorber would be inoperative. The prior art shock absorbers have fixed escape passages, and this is a disadvantage since each job must be customized with a particular shock absorber. With the shock absorber of the present invention, it is possible to adapt the same for different loads or jobs without making the shock absorber for any particular load. For example, the shock absorber may be used on a job where a light load is required by merely opening the slots 56. As the required load becomes higher and higher, the openings in the slots 56 are narrowed by adjusting the adjusting ring 62 accordingly and the escape area of the slots 56 is decreased. Therefore, it takes longer to dissipate the shock load and the shock absorber will absorb a higher shock load. It will be seen that all of the escape passages 56 are adjusted equally at the same time, and that all of the slots 56 in the inner tube 21 are equal in width, and the slots 63 in the adjusting tube 62 are equal in width.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In an adjustable hydraulic shock absorber, the combination, comprising: an outer tube; an inner tube disposed in said outer tube and spaced apart therefrom; a piston slidably mounted in said inner tube; a rod connected to said piston and extended outwardly from one end of said outer tube for receiving a shock load; said inner tube being adapted to receive hydraulic fluid from said outer tube, and said inner tube being provided with a plurality of longitudinally spaced apart hydraulic fluid escape slots through which fluid is adapted to escape from the inner tube into the outer tube when the piston is moved inwardly in the inner tube under a shock load; and, means adjustably mounted on said inner tube and movable over said slots in the direction of the longest dimension of said slots to progressively vary the open length of said slots, for controlling the amount of opening of said escape slots to control the deceleration of the piston when it is moved inwardly in said inner tube as shock loads are dissipated by forcing the fluid from the inner tube into the outer tube through said escape slots.

2. An adjustable hydraulic shock absorber as defined in claim 1, including, a first passageway means formed in the rear end of said shock absorber for flow of hydraulic fluid into the rear end of the inner tube behind one end of said piston; a check valve in said first passageway means to allow flow of hydraulic fluid into said inner tube and prevent flow of the hydraulic fluid out of said inner tube; and, a second passageway means in the front end of said shock absorber for conducting hydraulic fluid into the front end of said inner tube behind the other end of the piston.

3. An adjustable hydraulic shock absorber as defined in claim 1, wherein: said means for controlling the amount of opening of escape slots includes a plurality of longitudinally spaced apart slots adapted to be longitudinally aligned with the escape slots in said inner tube and movable relative to the last named slots for controlling the amount of opening of said slots.

4. An adjustable hydraulic shock absorber as defined in claim 1, wherein: said means for controlling the amount of opening of the escape slots includes a first member movably mounted on the periphery of said inner tube, a plurality of longitudinally spaced apart slots adapted to be longitudinally aligned with the escape slots in said inner tube, a second member movably mounted on the outer periphery of said outer tube, and means fixedly interconnecting said first and second members for moving the first member relative to the inner tube when said second member is moved for controlling the amount of opening of the escape slots in said inner tube.

5. An adjustable hydraulic shock absorber as defined in claim 1, wherein: said one end of the outer tube from which the rod extends is enclosed by a front cylinder head which is slidably mounted in the tube; said front cylinder head is releasably secured therein by a removable retainer means; said rod is slidably mounted through the front cylinder head; and, the other end of the outer tube is enclosed by a rear cylinder head which is slidably mounted in the tube and releasably secured therein by a removable retainer means.

6. An adjustably hydraulic shock absorber as defined in claim 5, wherein: one end of said inner tube is seated against the front cylinder head and the other end of the inner tube terminates adjacent the rear cylinder head; and, a resilient sealing means is mounted between the rear cylinder head and said other end of the inner tube.

7. An adjustable hydraulic shock absorber as defined in claim 1, wherein: said means for controlling the amount of opening of the escape slots includes a first member movably mounted on the exterior of said inner tube, a second member movably mounted on the exterior of said outer tube, and means interconnecting said first and second members for moving the first member relative to the inner tube when said second member is moved for controlling the amount of opening of the escape slots in said inner tube.

8. An adjustable hydraulic shock absorber as defined in claim 7, wherein: said means for interconnecting said first and second members comprises a pin connected to said first member and extended through a slot in said outer tube and into fixed engagement with said second member; and, sealing means disposed on opposite sides of the last named slot to prevent leakage of fluid therethrough.

References Cited by the Examiner

UNITED STATES PATENTS

| 919,508 | 4/09 | Williams | 137—675.32 |
| 934,377 | 2/11 | Kilgour | 188—88 |
| 1,373,315 | 3/21 | Dunn | 188—88 |
| 1,494,135 | 3/24 | Robison et al. | 188—88 |
| 2,620,659 | 12/52 | Karez | 137—625.32 X |
| 2,627,405 | 2/53 | Hlatro et al. | 188—87 |
| 2,628,692 | 2/53 | Hufferd | 188—88 |
| 2,966,926 | 1/61 | Zarybnicky | 137—675.32 X |
| 3,005,468 | 10/61 | Erwin et al. | 137—675.31 |

FOREIGN PATENTS

| 288,403 | 4/28 | Great Britain. |
| 296,164 | 8/28 | Great Britain. |

ARTHUR L. LA POINT, *Primary Examiner.*

EUGENE G. BOTZ, *Examiner.*